W. BRANDON.
BERRY PICKER.
APPLICATION FILED JULY 17, 1911.
1,020,881.
Patented Mar. 19, 1912.
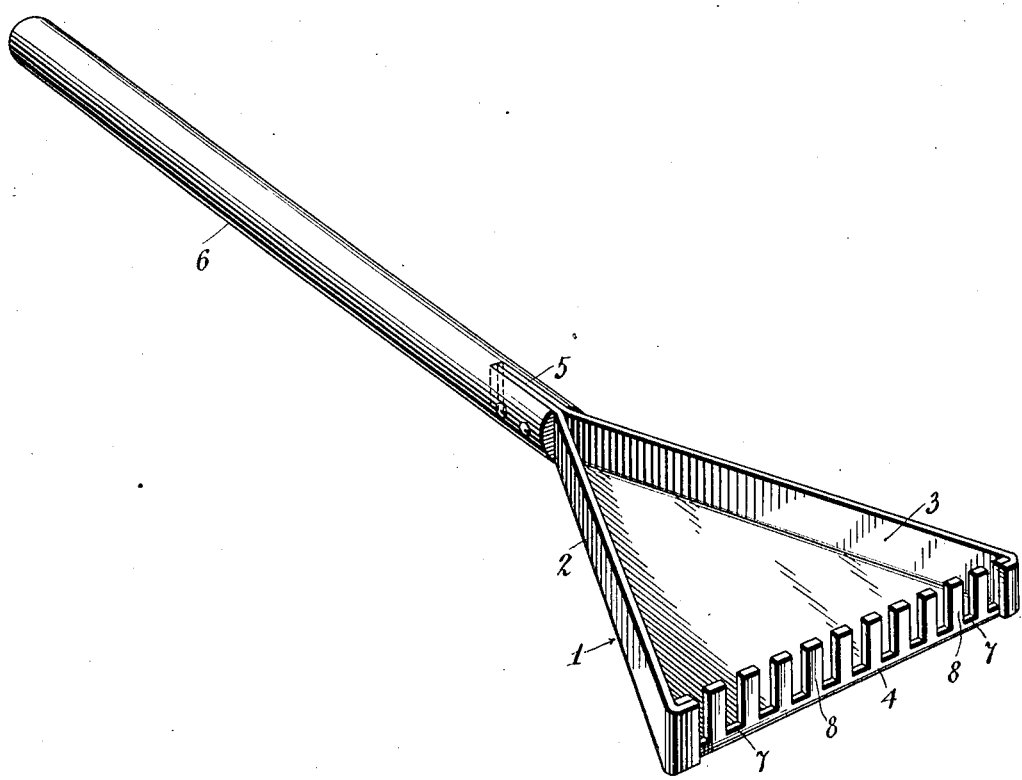
Witnesses
Inventor
W. Brandon
By
Attorneys

UNITED STATES PATENT OFFICE.

WILLIAM BRANDON, OF WOODBINE, IOWA.

BERRY-PICKER.

1,020,881.     Specification of Letters Patent.     Patented Mar. 19, 1912.

Application filed July 17, 1911. Serial No. 638,986.

*To all whom it may concern:*

Be it known that I, WILLIAM BRANDON, a citizen of the United States, residing at Woodbine, in the county of Harrison, State of Iowa, have invented certain new and useful Improvements in Berry-Pickers; and I do hereby declare the following to be a full, clear, and exact description of the invention, such as will enable others skilled in the art to which it appertains to make and use the same.

My invention relates to new and useful improvements in berry picking devices and more especially to devices for use in picking gooseberries and the like which hang from the branches and beneath the same, and the object of my invention is to improve the construction and increase the efficiency of berry pickers of the above described type.

With this and other objects in view my invention will be more fully described, illustrated in the drawings which show a preferred embodiment thereof and then specifically pointed out in the claim which is attached to and forms a part of this application.

In the accompanying drawing, the figure is a perspective view of the berry picker.

Referring more specifically to the drawings, in which similar reference numerals designate corresponding parts throughout, my invention will be seen to consist primarily of a substantially triangular shaped body member 1 having upwardly extending sides 2 and 3 and end 4. As shown the sides are extended and brought together to form an ear 5 by means of which is secured a handle 6. The end 4 of the body member is provided with a plurality of spaced apart vertical slits 7 by means of which a plurality of parallel spaced apart teeth or fingers 8 are formed.

As shown the entire body portion of the device is formed from a single piece of heavy, stiff sheet metal the rigidity of which is sufficient to withstand the strain to which it will be subjected.

In operation the body member is inserted beneath the branches and then raised until the branches are engaged between the teeth when the device is pulled toward the operator thereby raking the berries off from the bushes into the receptacle which is formed by the body member itself. By this means it will be seen that I have formed an extremely simple and efficient device by means of which the berries may be picked much more rapidly than would be possible by hand.

It will be understood that minor changes in construction may be made to adapt the device for use with various kinds of berries without in the slightest degree departing from the spirit of my invention.

What I claim is:—

A berry picker, comprising a substantially triangular shaped receptacle formed from a single piece of sheet metal, one side of said receptacle being slitted to form a plurality of teeth, the other sides of said receptacle being extended and brought together, and a handle secured to said extended side portions.

In testimony whereof, I affix my signature, in presence of two witnesses.

WILLIAM BRANDON.

Witnesses:
R. L. DAVIS,
W. E. HUNTER.